F. G. WHITE.
MANIFOLD ATTACHMENT FOR TYPEWRITERS.
APPLICATION FILED OCT. 7, 1918.
1,399,912.
Patented Dec. 13, 1921.
11 SHEETS—SHEET 6.
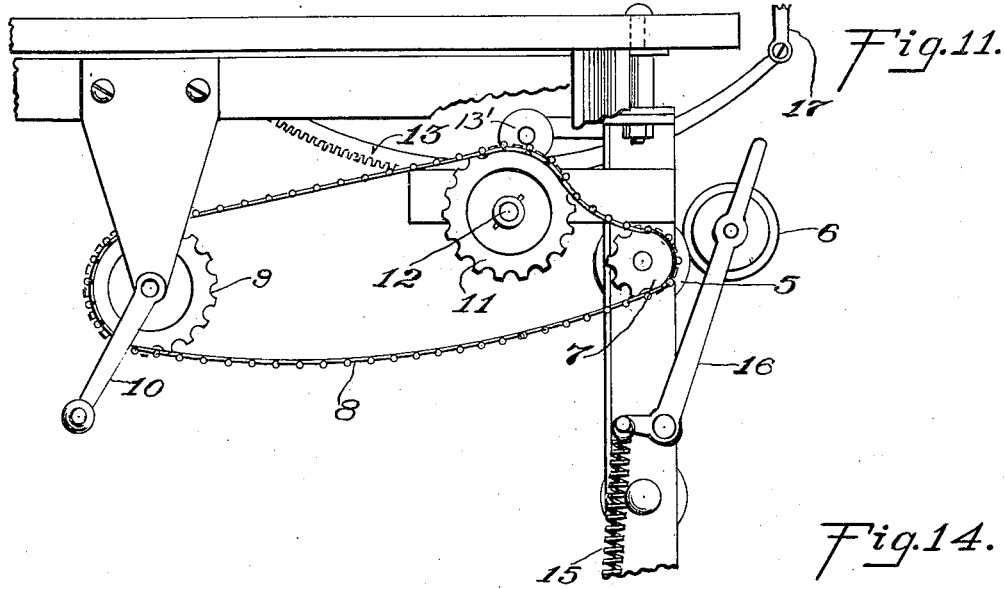
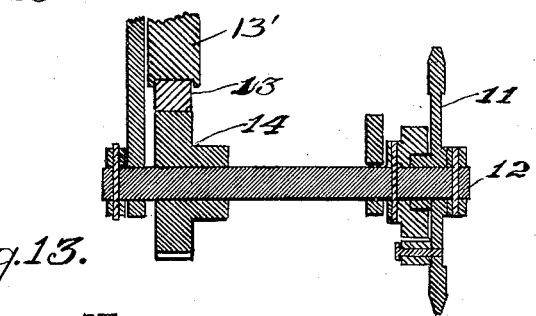
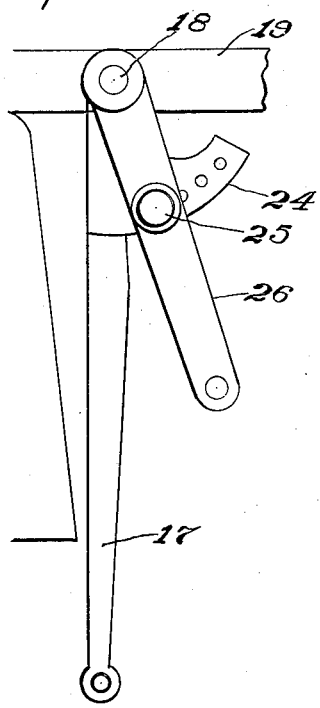
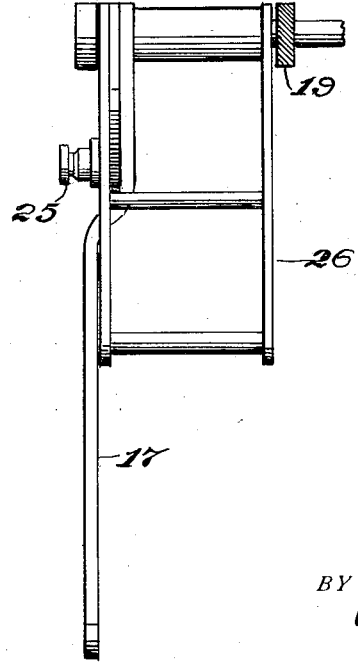
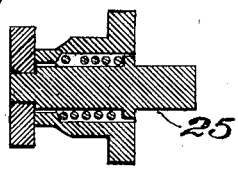
INVENTOR
Fred G. White
BY Arthur C. Brown
ATTORNEY F. G. WHITE.
MANIFOLD ATTACHMENT FOR TYPEWRITERS.
APPLICATION FILED OCT. 7, 1918.
1,399,912.
Patented Dec. 13, 1921.
11 SHEETS—SHEET 7.
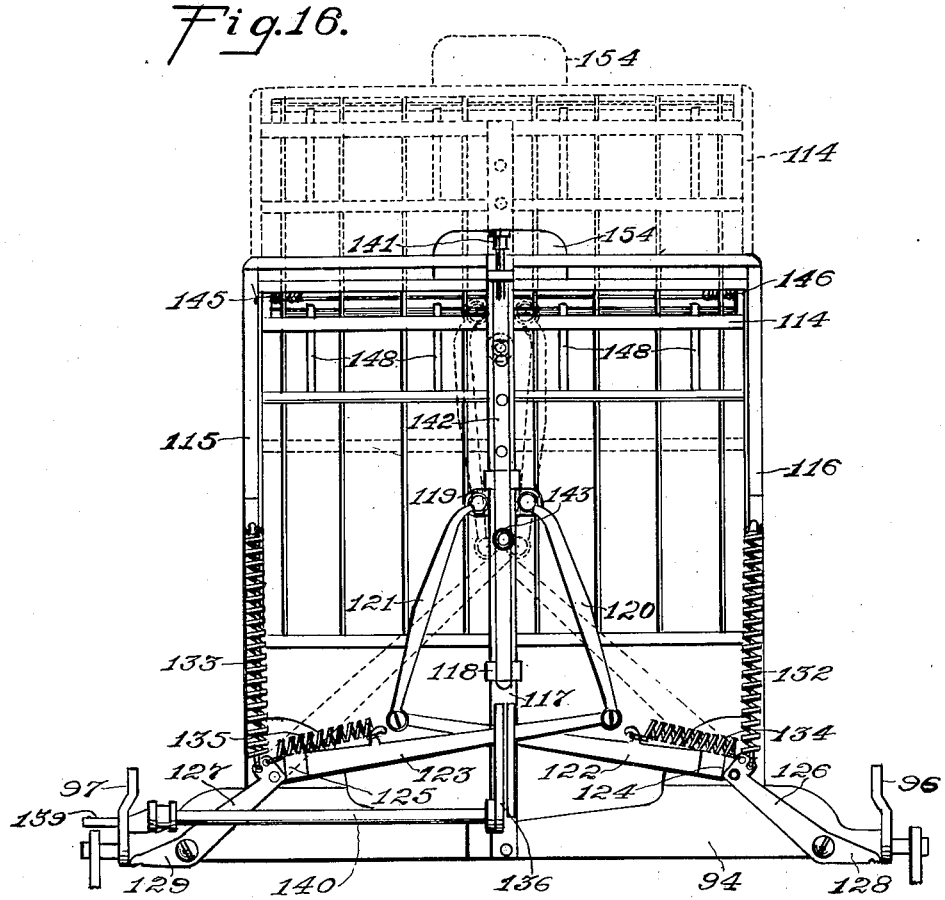
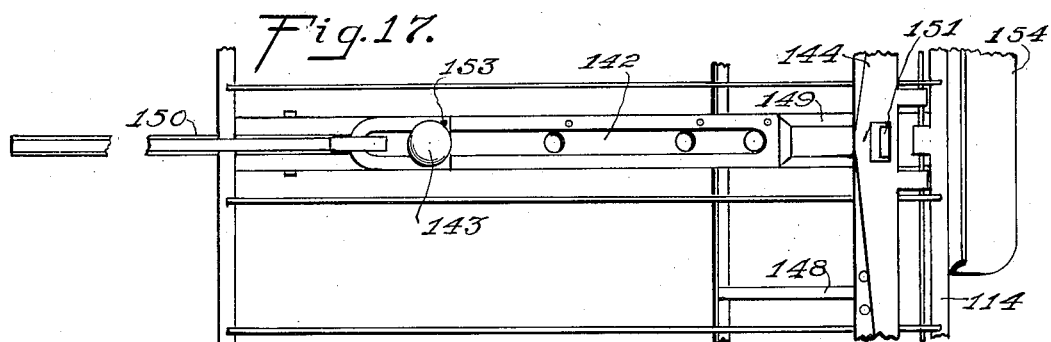
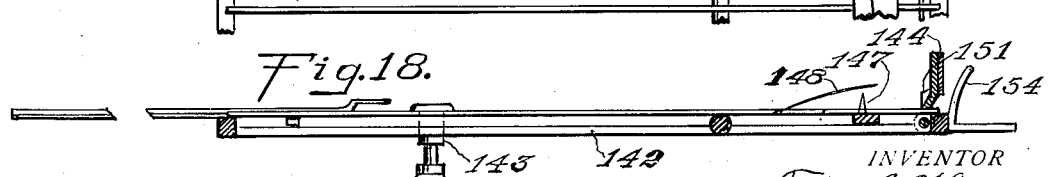
INVENTOR
Fred G. White
BY Arthur C. Brown
ATTORNEY F. G. WHITE.
MANIFOLD ATTACHMENT FOR TYPEWRITERS.
APPLICATION FILED OCT. 7, 1918.
1,399,912.  Patented Dec. 13, 1921.
11 SHEETS—SHEET 8.
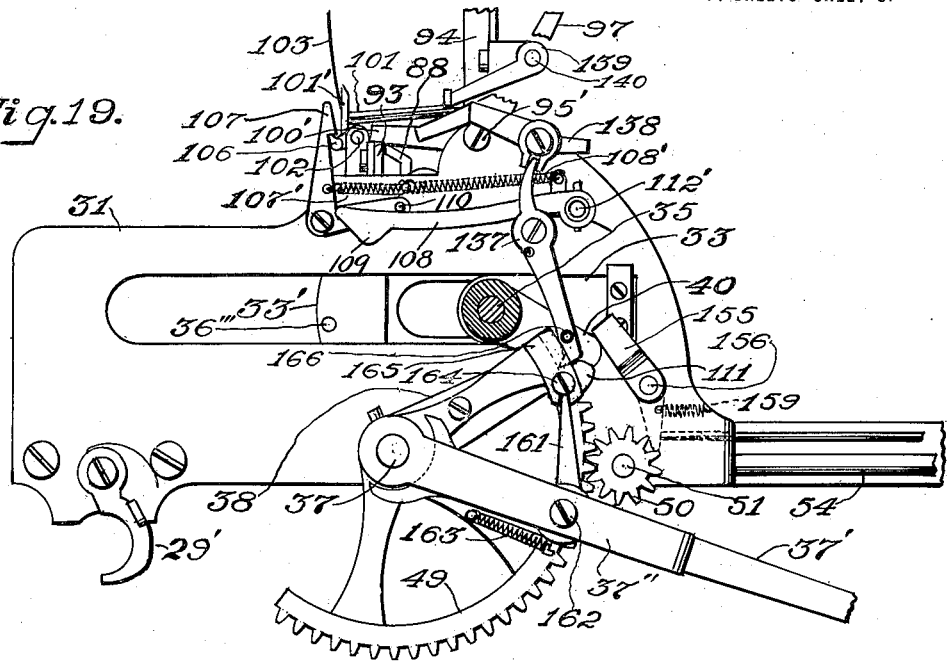
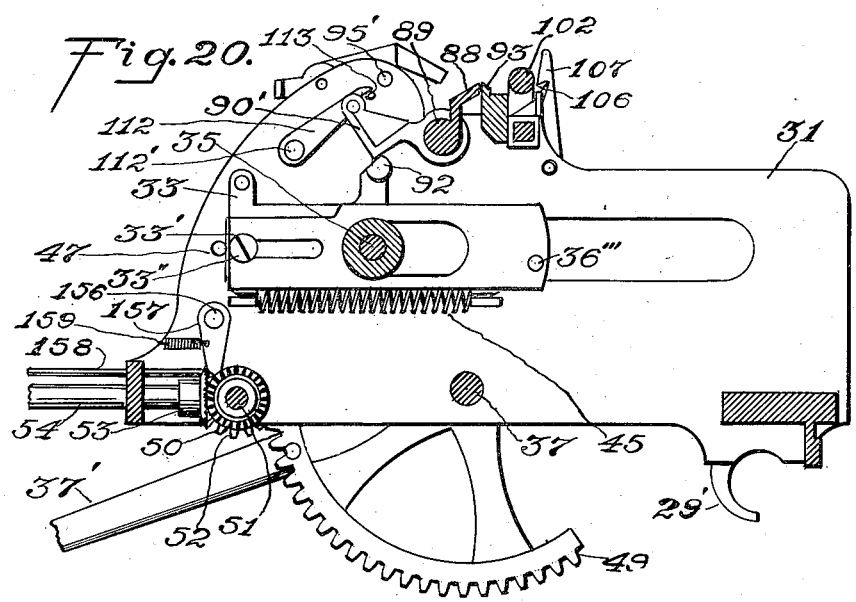
INVENTOR
Fred G. White.
BY
ATTORNEY F. G. WHITE.
MANIFOLD ATTACHMENT FOR TYPEWRITERS.
APPLICATION FILED OCT. 7, 1918.

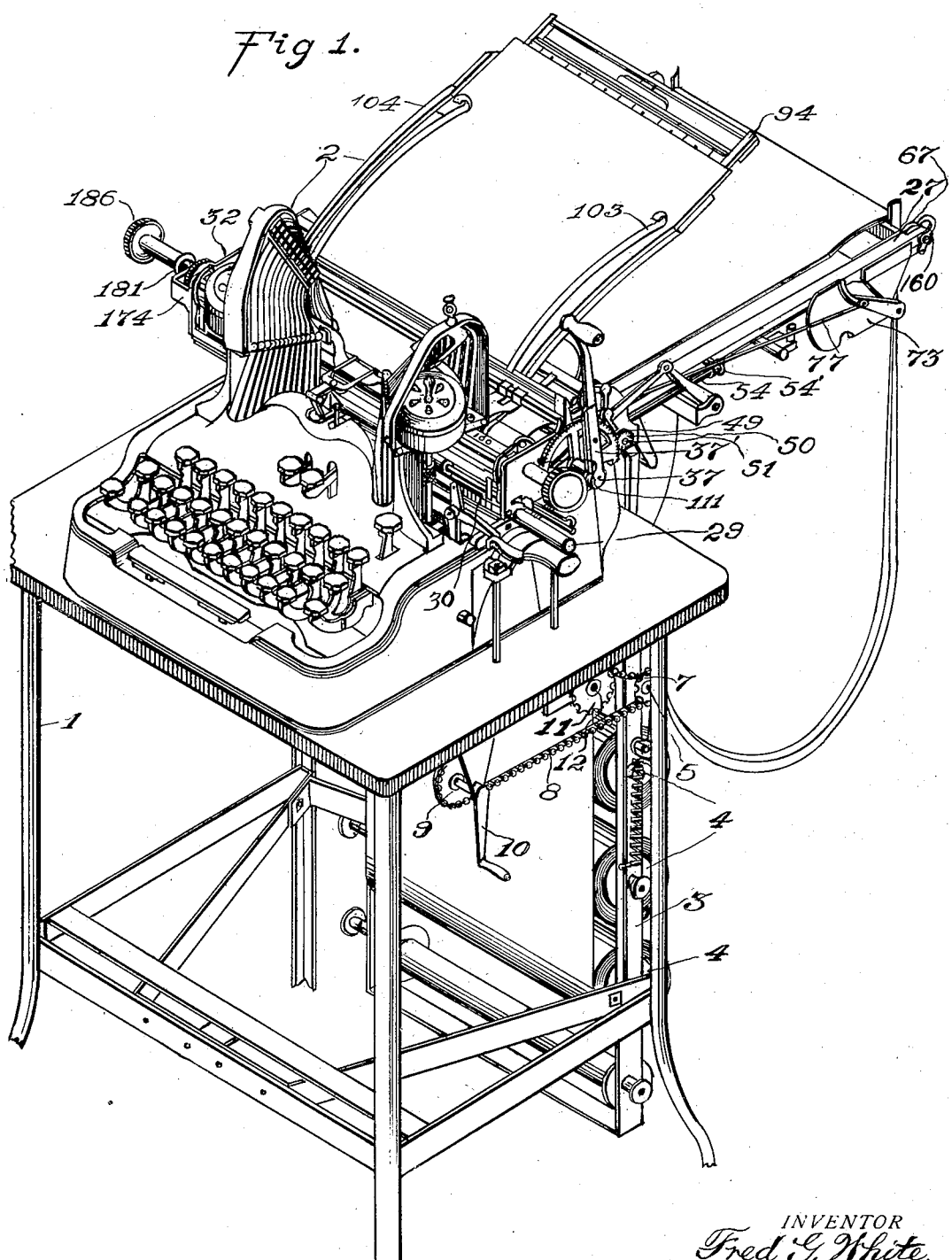

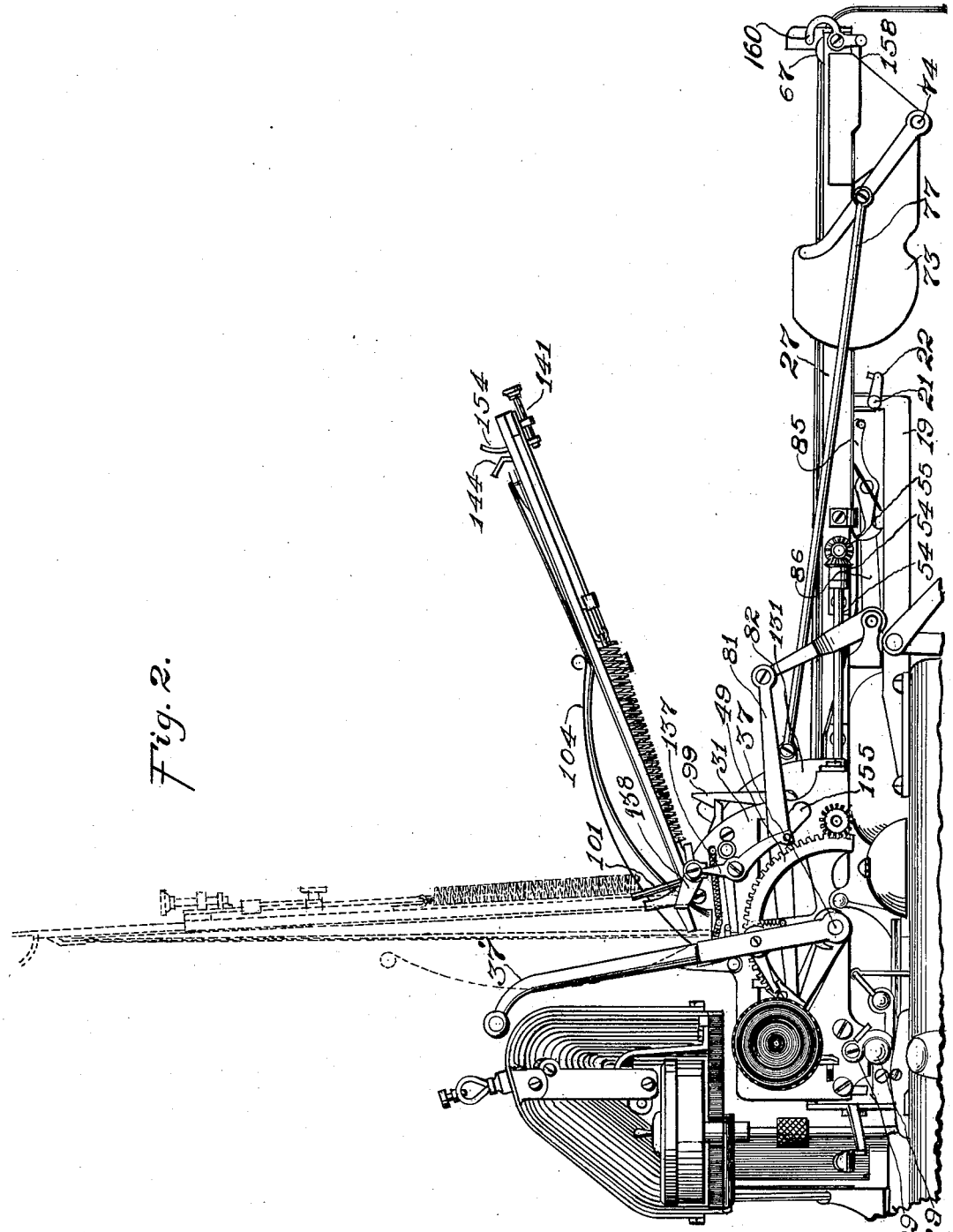

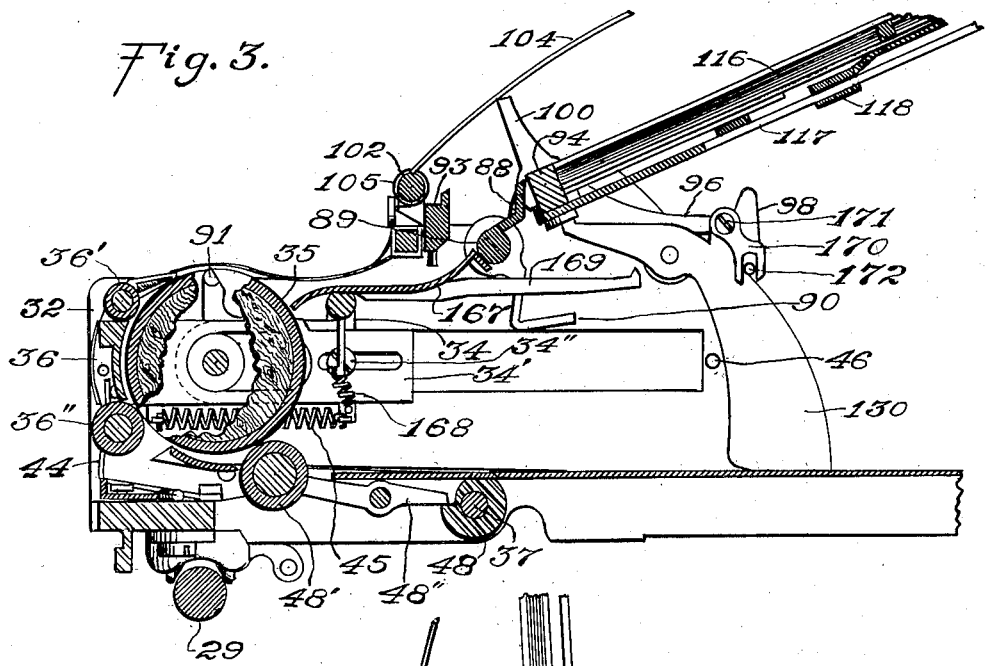
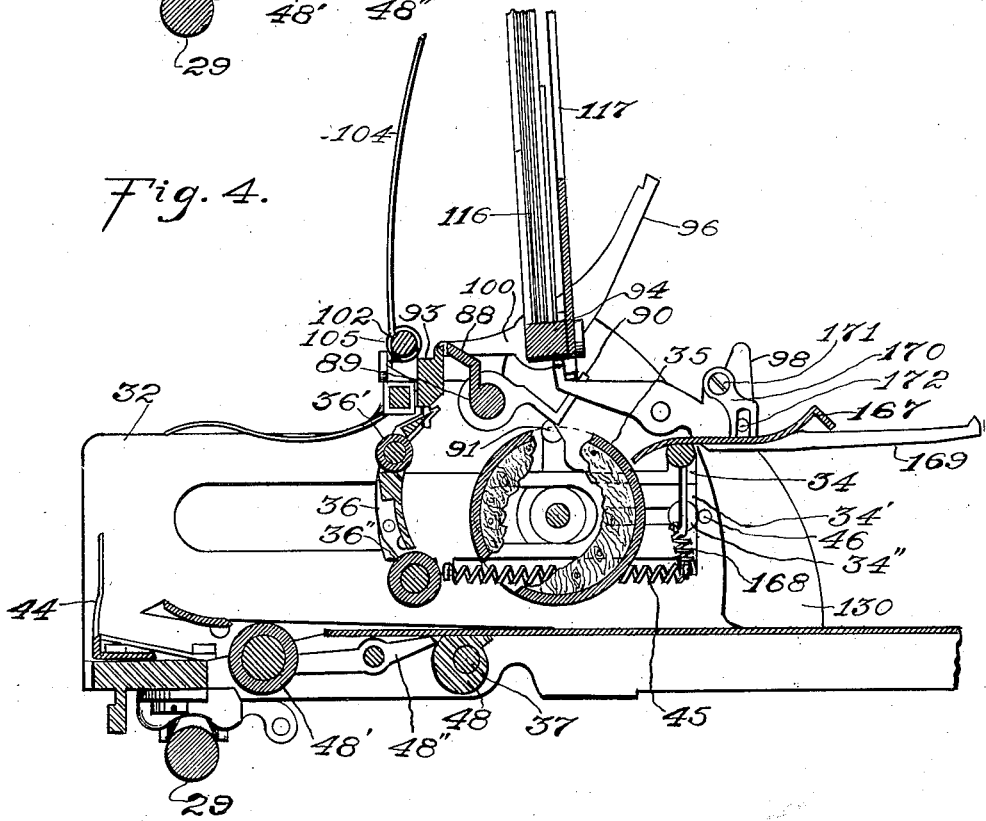

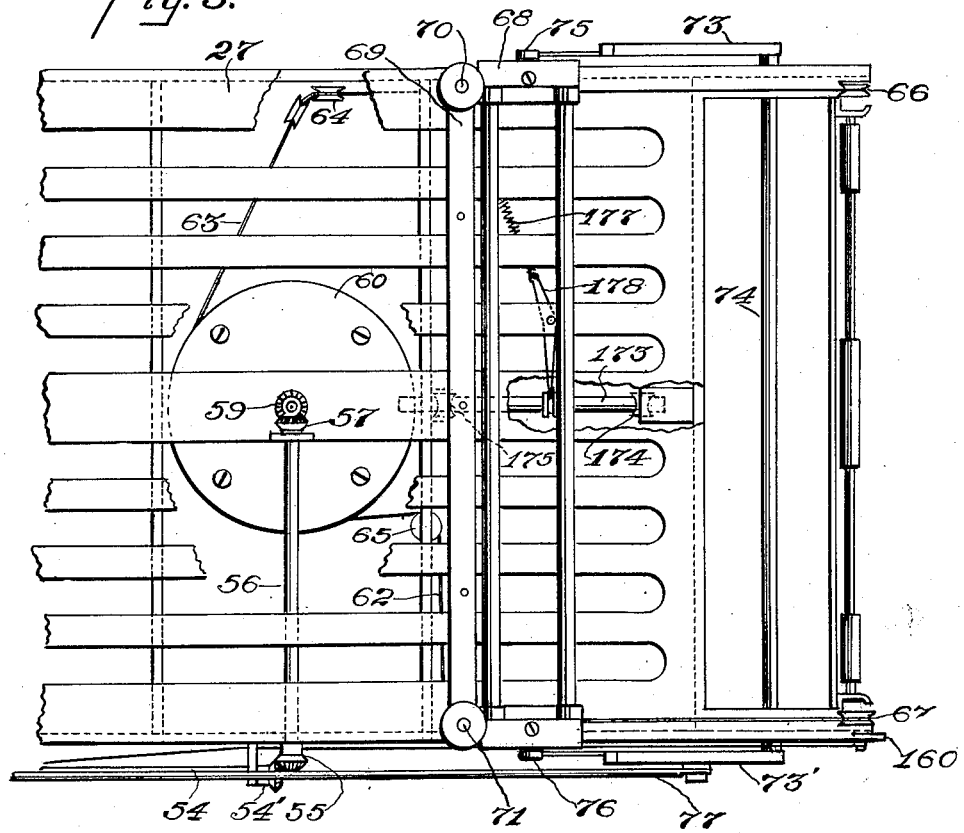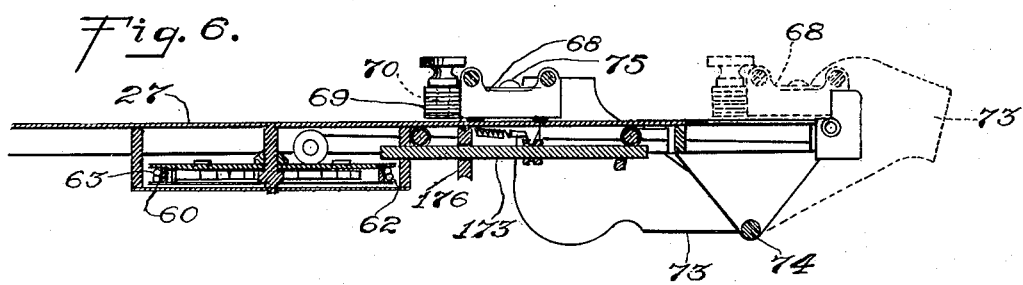

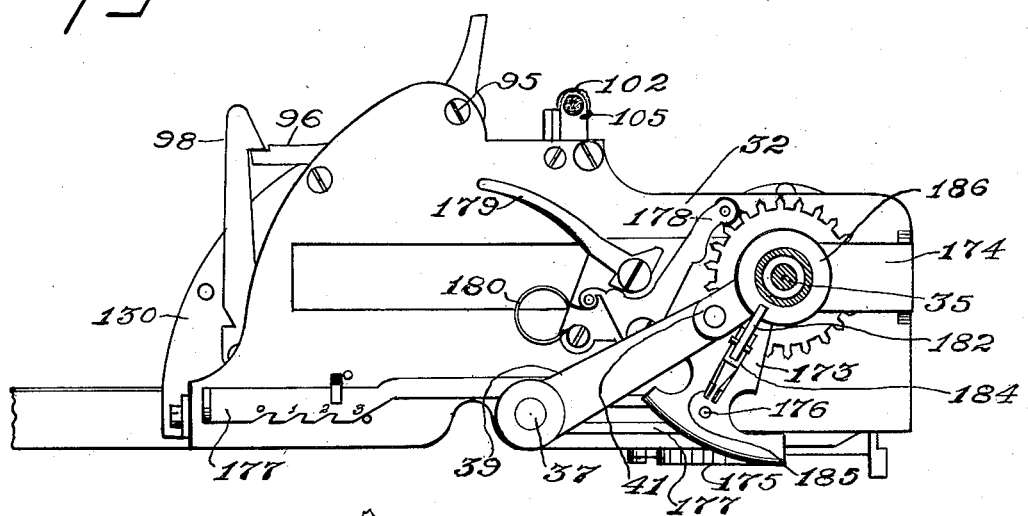
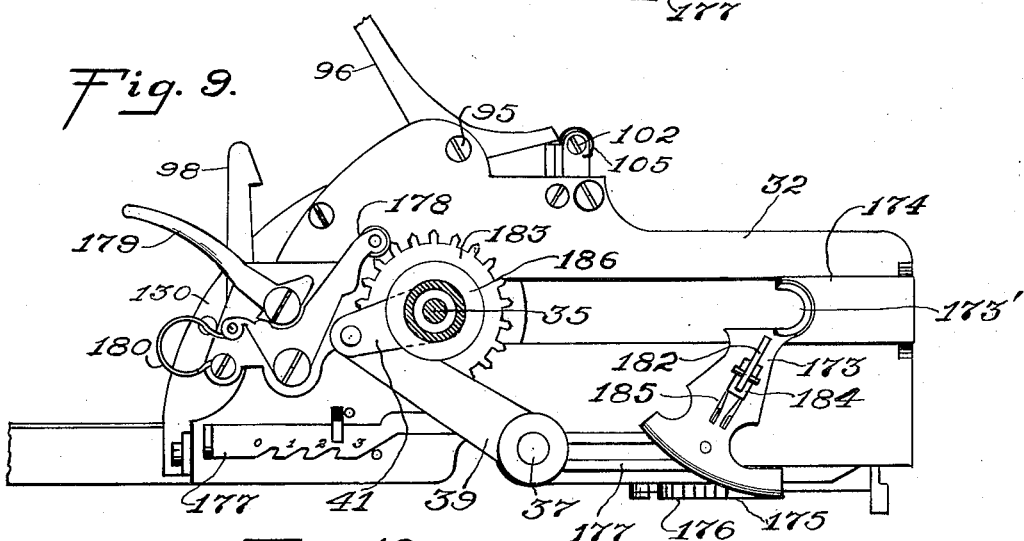
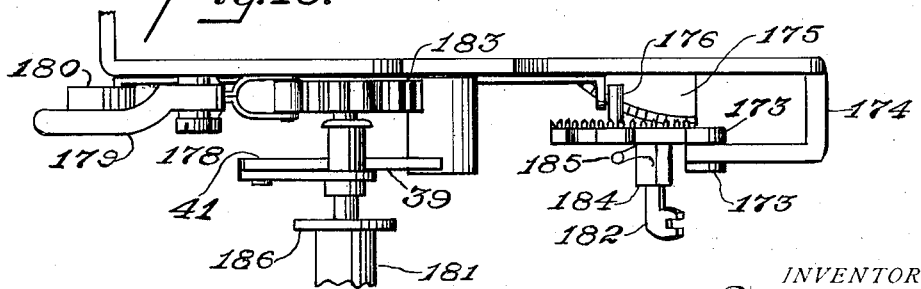

1,399,912.  Patented Dec. 13, 1921.
11 SHEETS—SHEET 9.

INVENTOR
Fred G. White
BY
Arthur C. Brown
ATTORNEY

F. G. WHITE.
MANIFOLD ATTACHMENT FOR TYPEWRITERS.
APPLICATION FILED OCT. 7, 1918.
1,399,912.
Patented Dec. 13, 1921.
11 SHEETS—SHEET 10.
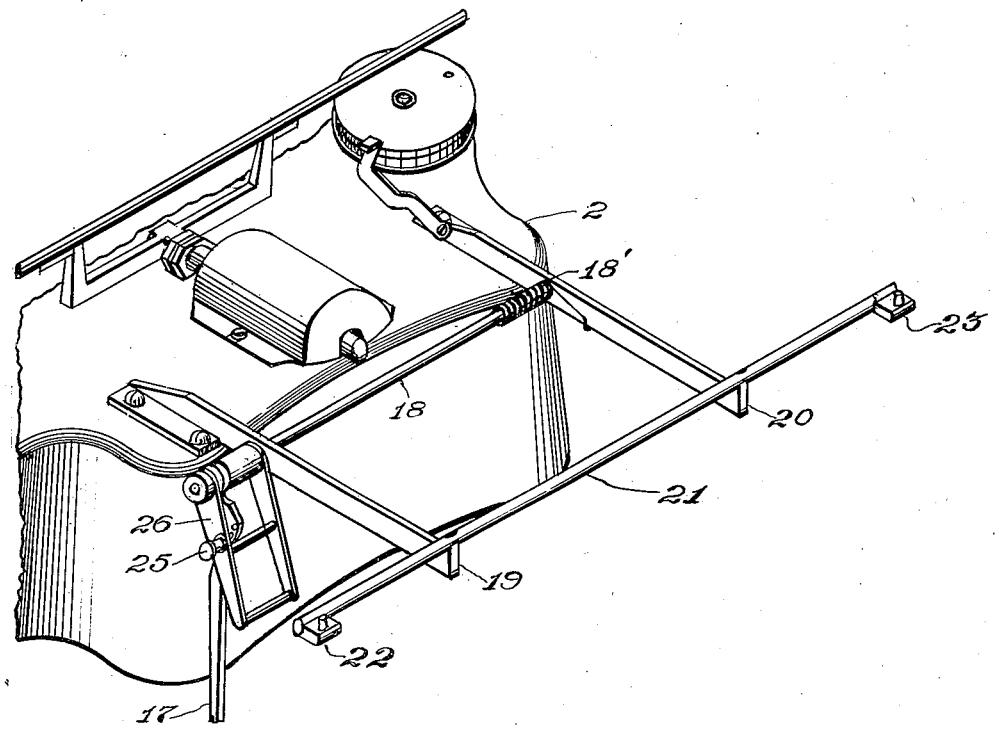
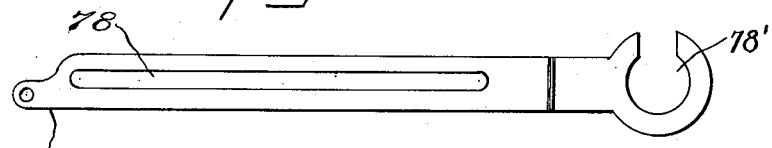
INVENTOR
Fred G. White
BY
ATTORNEY F. G. WHITE.
MANIFOLD ATTACHMENT FOR TYPEWRITERS.
APPLICATION FILED OCT. 7, 1918.

1,399,912.

Patented Dec. 13, 1921.
11 SHEETS—SHEET 11.

INVENTOR
Fred G. White
BY
ATTORNEY

UNITED STATES PATENT OFFICE.

FRED G. WHITE, OF KANSAS CITY, MISSOURI, ASSIGNOR TO ALBERT PICO, OF KANSAS CITY, MISSOURI.

MANIFOLD ATTACHMENT FOR TYPEWRITERS.

1,399,912.  Specification of Letters Patent.  Patented Dec. 13, 1921.

Application filed October 7, 1918. Serial No. 257,250.

*To all whom it may concern:*

Be it known that I, FRED G. WHITE, a citizen of the United States, residing at Kansas City, in the county of Jackson and State of Missouri, have invented certain new and useful Improvements in Manifold Attachments for Typewriters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to manifolding attachments for typewriters.

One of the objects of the invention is to provide a manifolding attachment which may be readily attached to and detached from a standard make of typewriter without materially altering the construction of the typewriter mechanism.

For the purpose of illustration I have shown the attachment applied to a standard No. 9 Oliver typewriter, to which it is properly adapted, but in its broad aspect the invention is not limited to any particular make of mechanism.

The invention contemplates the provision of means to automatically feed the carbon paper between the sheets on which the manifold copies are to be made and to retract the carbon from between the sheets after manifolding has been accomplished.

The invention also contemplates the provision of means for measuring the desired length of paper preparatory for tearing it from the roll of which it was originally a part, means being provided for clamping the paper by a straight edge or knife so that a clean cut edge will be left at the point of severance.

Other novel features of my invention will be referred to hereafter, it being understood that changes in form, proportion and minor details of construction may be resorted to without departing from the spirit of the invention or sacrificing any of its advantages.

In the drawings:

Figure 1 is a perspective view of a typewriter to which my invention is applied.

Fig. 2 is a side elevation of the same.

Fig. 3 is a cross sectional view through the platen in its operative position and its co-operating mechanism, the paper measuring frame shown in longitudinal section at rest and the knife for clamping the paper to be torn is shown in its inoperative position.

Fig. 4 is a similar view with the platen retracted, the knife in its paper gripping position and the paper measuring frame in its elevated position.

Fig. 5 is a plan view of the rear half of the manifolding attachment table and the carbon carriage.

Fig. 6 is a vertical longitudinal sectional view through the same.

Fig. 7 is a fragmentary detail view of the carbon carriage clamping bars.

Fig. 8 is a side elevational view from the side opposite to Fig. 2 showing the paper spacing mechanism, the platen being in the position shown in Fig. 3.

Fig. 9 is a like view with the platen in the position shown in Fig. 4.

Fig. 10 is a fragmentary plan view of the same.

Fig. 11 is a side elevational view of the paper feed drive.

Fig. 12 is a detail side view of the paper feed governor.

Fig. 13 is an edge view of the same from the rear.

Fig. 14 is a sectional view through the paper feed driving mechanism.

Fig. 15 is a sectional view through the feed governor stop pin.

Fig. 16 is a front view of the paper measuring frame.

Fig. 17 is an elevational view of the central guide bar for the measuring frame.

Fig. 18 is an edge view of the same, and

Fig. 19 is an enlarged outside elevational view of one of the main shaft supporting flanges and the operating mechanism carried thereby.

Fig. 20 is a similar inside view of the flange and mechanism supported thereby.

Figs. 26 and 27 are detail views of links for connecting the carbon carriage operating mechanism to the platen shaft.

Fig. 28 is a fragmentary perspective view of a typewriter frame, and a supporting bracket for the manifold carriage.

Figure 21:
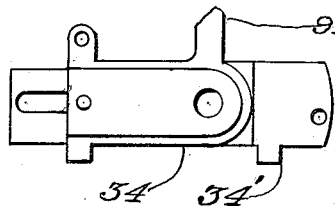
Fig. 21 is an inside elevational view of one of the slide plates carried by the flanges.
Figure 22:
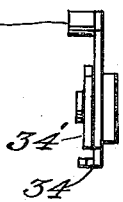
Fig. 22 is an edge view of the same.
Figure 23:
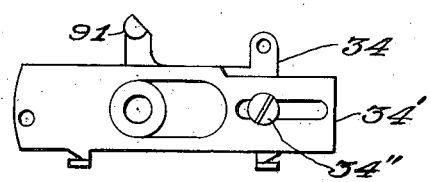
Fig. 23 is an outside view of the slide plate.
Figure 24:
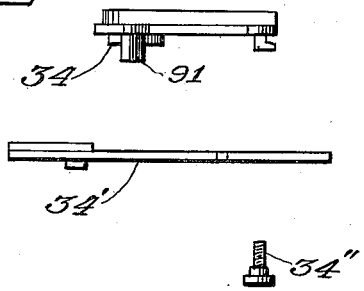
Fig. 24 is a disassociated view of the slide plate shown, the two parts of the plate and the screw for securing the same.

The attachment as shown is provided with a table which may be attached to the base of the typewriter by drilling or tapping four holes in the rear thereof and two upon the side. Those in the rear are for attaching brackets on the frame which carries the rail, supporting the rear end of the table and the paper feed governor which adjusts the mechanism to govern the speed at which the paper is fitted into the mechanism.

The paper is fed into the machine through the rear from rolls, one roll for each copy desired, the sheets being in continuous strips which are passed through a traveling frame or carriage which may be properly designated a carbon holder to which the carbon sheets are attached. When the paper and the carbon reach the forward end of the table, they pass through a carriage carried by the table which takes the place of the ordinary typewriter carriage which has previously been removed. The typewriting operation is performed in the usual manner until the desired copy is made. When the typewriting operations have been completed for any particular piece of work, the handle is operated which retracts the carbon from between the sheets. An extensible paper measuring frame then pulls the manifold copies through the carriage a desired distance and a clamping bar or knife clamps the paper against an abutment so that the operator may grasp the manifold copies and tear them across the knife edge to make a clean cut at the point of severance. The sheets remaining in the machine still have the carbons between them and the typewriter operation may be repeated upon turning the handle to its original position.

Referring now to the drawings by numerals of reference:

1 designates a typewriter stand on which a machine 2 of approved construction may be secured. The typewriter stand carries a vertical frame 3 in which are a plurality of paper carrying rollers 4 which are mounted idly in bearings in a well known manner and at the upper end of frame 3 are two rollers, 5 and 6, the roller 5 is a driven roller and carries on one end a sprocket 7 which is adapted to be driven through a chain 8 by means of a crank operating sprocket 9, the crank 10 being manually driven. The chain 8 passes over a sprocket 11 having pawl and ratchet engagement with a shaft 12 whereby the sprocket may overrun the shaft in one direction. The shaft 12 also is adapted to be driven by a rack 13 meshing with the gear 14 rigid on said shaft, and held in mesh by the roller 13', Figs. 9 and 14, the engagement being such that when the rack moves toward the rear of the stand, the shaft will pick-up the gear 8 but when the rack moves toward the forward end of the stand, the ratchet will be ineffective to connect the gear 8 to the shaft.

From the foregoing it is apparent that the roller 6 may be driven either manually or mechanically and inasmuch as the gear sprocket may overrun its shaft, the roller 6 may be operated independently of any movement of the rack. The purpose of the manual operation is to permit an initial feeding of the paper off the rolls 4 through the rollers 6 and 7, the roller 7 being a friction roller between which and the roll 6 the paper travels to the manifold attachment. The tension of the roller 6 against the paper and roller 5 may be determined by the springs 15 which engages the frame 3 and one end of one of the elbow levers 16 pivoted to the frame 3 and upon which the friction roller 7 is mounted.

The rack 13 is adapted to have intermittent movement imparted to it by a lever 17 pivoted on shaft 18 adapted to be rotated against the action of spring 18'. The shaft 18 is journaled in the bars 19 and 20 which constitute the brackets for the transverse guide rail 21 having the stops 22 and 23, which bar 21 assists in supporting the table or carriage which is the base for the manifold attachment. The bar 17 carries a perforated segment 24, the openings of which are adapted to be engaged by the spring pressed bolt 25 on the swinging link 26 mounted on the shaft 18. The link is adapted to be intermittently engaged by a pick-up device on the carriage and by adjusting the link with respect to the segment the throw of the rack will be determined, consequently the duration of rotation of the roller 6 will be governed and the amount of paper fed at each operation may thus be determined, it being understood that the machine is capable of using various lengths of sheets or to permit varying lengths of sheets to be torn from the rolls.

27 is the transversely movable table or carriage which constitutes a base of the manifold attachment. This carriage is adapted to rest upon the bar 21 carried by the brackets 19 and 20 and upon the guide rail 29. The base is detachably secured to the guide rail 29 by means of the hooks 29' and said base or carriage is provided at its forward end with a rack 30 (see Fig. 1) adapted to be engaged by the usual pawl or dog on the typewriter to advance the carriage transversely of the machine in substantially the same manner as the ordinary typewriter carriage which has previously been removed. The base carries its own platen and paper feeding mechanism which may broadly conform to the ordinary typewriter platen feed mechanism.

At the forward part of the table or carriage 27 are upstanding slotted flanges 31 and 32, the slots providing guides for the sliding plates 33 and 34. In plates 33 and 34 is journaled the platen 35, 33' and 34' are plates mounted on plates 33 and 34 and have independent movement and carry the pivoted yoke 36, carrying the paper guide rollers 36' and 36". The plates 33 and 33' and 34 and 34' are slidingly connected by screws 33" and 34" respectively. Journaled in the right hand side of carriage 27 is a shaft 37 carrying an operating handle 37' whereby the shaft may be rotated. The shaft extends entirely across the carriage but beneath it and at its respective ends are cranks 38 and 39 terminally connected to the links 40 and 41 which in turn are loosely connected on the platen shaft journaled in the plates 33 and 34. Therefore when the handle is turned to rotate its shaft 37, the sliding plates are moved rearwardly, bringing the platen and complementary mechanism mounted on plates 34 into the positions shown in Figs. 4, 9, 19 and 20.

In making the rearward travel, the two guide rollers 36' and 36" are first released from the tension of the up-standing relatively heavy leaf springs 44, but will be held against the platen by the weaker coil springs 45, until the yoke 36 has reached the limit of its retrograde movement. Then the plates 33' and 34' which carry the yoke 36 will be retarded by the pins 46 and 47 so that the platen may move away from the yoke and rollers and the paper will be loose between the rollers and platen. In carrying the platen rearwardly, the cams 48 attached to the operating shaft depress the lower roller 48' carried by the levers 48" (one set at each end of roller 48') until it is carried down below the paper and platen as will be presently explained.

Figure 25:
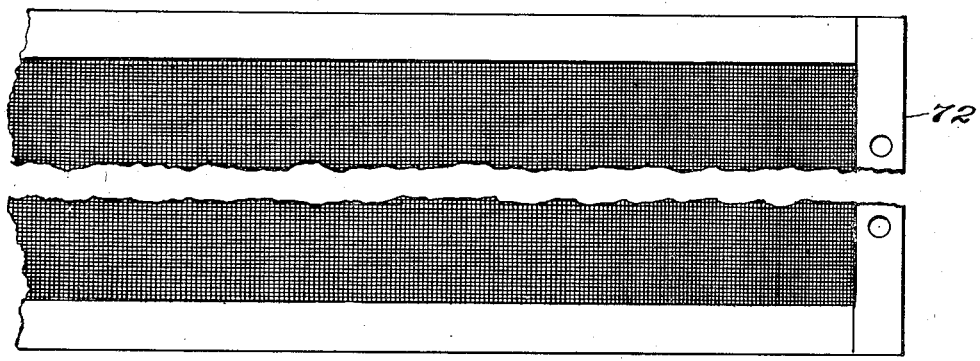
Fig. 25 is a detail view of an improved form of carbon paper.
Figure 29:
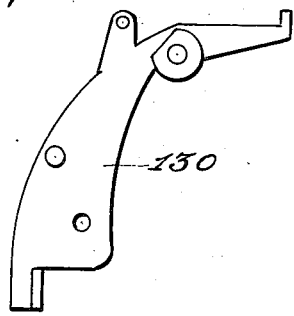
Figs. 29, 30 and 31 are detail views of a form of bracket attached to the manifold carriage to support certain mechanism.
Figure 30:
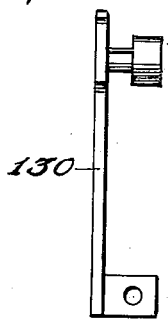
Figure 31:
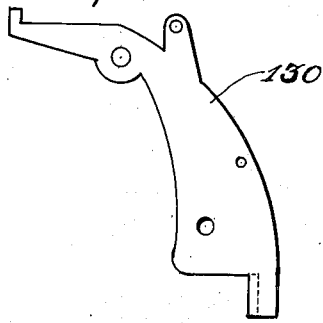

On the drive shaft is a gear segment 49 adjacent to its operating table which meshes with a gear 50 on the shaft 51 journaled in the side of the frame and said shaft 51 carries a beveled gear 52 meshing with a similar gear 53 on the longitudinal shaft 54 having at its rearward end a beveled gear 54' which meshes with a gear 55 on the transverse shaft 56, midway of the frame 27, and which carries at its opposite end a beveled gear 57 meshing with a beveled gear 59 on the spring motor 60, the drum of which carries the cords 62 and 63 passing over the pulleys 64 and 65 on opposite sides of the frame and over the pulleys 66 and 67 at the rear of the frame and which are then connected to the opposite ends of the carbon carriage 68 which is provided with a plurality of alternating bars 69 and 69' on the pins 70 and 71 between which the carbons may be secured. The number of carbons adapted to be used in the machine is limited only by the thickness of the carriage. The bars may contain pins or projections to engage perforated carbons to prevent the accidental displacement and if desired, specially prepared carbons 72 may be used having taped reinforcements along the back and side edges as shown in Fig. 25.

The rearward movement of the crank will be effective in retracting the carbon carriage and the carbons independent of the paper, in response to the cords or cables heretofore described in connection with the spring motor, but the forward movement of the crank will be effective in forcing the carbon carriage forward by means of the cams 73 and 73' mounted on the rock shaft 74 carried by the frame. These cams bear against anti-friction rollers 75 and 76 on the carbon carriage. The cams are operated by a linked rod consisting of the members 77 and 77', one member 77, of which engages one of the cams and the other member 77' of which is hooked at 78' to engage the platen shaft, the member 77' having an elongated slot 78 engaging a pin on one of the platen supporting brackets 130 to insure a direct pull on the cam which it engages.

Figure 32:
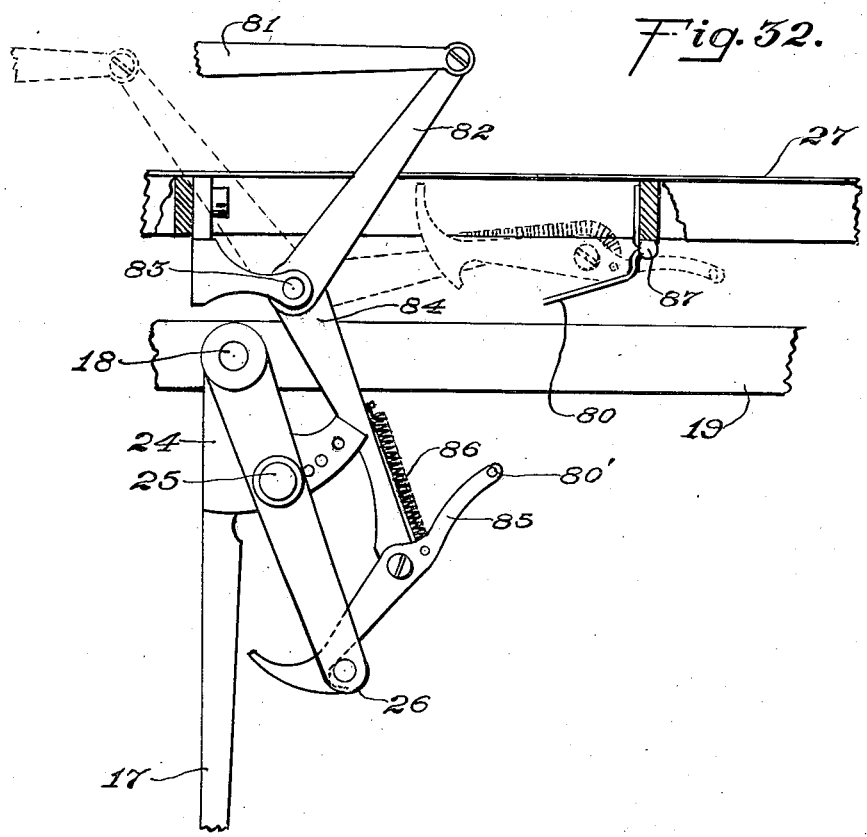
Fig. 32 is an enlarged detail view of a mechanism for operating the paper roll feed.

It will thus be seen that when the platen moves up to the type bars of the typewriter, the carbons will be advanced along with the paper by the descending cams 73 and 73' but as soon as the platen is moved rearwardly, the spring motor which has been previously wound, will retract the carbon carriage. The segment 49 is connected to the crank 82 by link 81 on the rock shaft 83 carried by brackets beneath the frame and on this rock shaft is a downwardly inclined crank 84 carrying a pivoted dog or pick-up 85 secured to the crank 84 intermediate its ends and held in yielding relation thereto by a spring 86. When the operating handle is moved rearwardly and downwardly, the shaft 83 is rocked so that the dog 85 will move downwardly and pick up the link 26 on the paper feed mechanism and as the operating handle moves forwardly, the link 26 and the paper feeding segment 13 is operated until the dog 85 comes in contact with the throw off projection 87 on the underside of the frame when the link is released. If the pick up dog 85 has released the part 26 before it reaches the kick off 87 then pin 80' will ride against the under side of inclined guide 80 and a continued upward movement will tilt 85 in the position shown in dotted lines, Fig. 32 and prevent 80' from passing up through the base of carriage 27. In this way an intermittent feed of the paper is provided.

88 designates a pivoted knife or straight edge carried by the rock shaft 89 journaled in the guide flanges of the transversely movable carriage 27. The rock shaft is provided at its opposite ends with cams 90 and 90', which when the platen moves rearwardly, are engaged by the pins 91 and 92 to tilt the knife forwardly against a clamping bar 93 rigid with respect to the carriage 27 so that the paper may be gripped and torn off at the prescribed point.

I have provided means for measuring the amount of paper to be torn off and the means here shown consists of a pivoted frame having an adjustable extension which is spring actuated so as to pull the paper through the carriage varying distances according to the length of the bill of lading.

The main portion of the measuring device consists of a pivoted base frame 94 mounted to swing on the journals 95 and 95' in the plates 31 and 32 on the carriage 27. The frame carries two latch members 96 and 97 which consist of rearwardly projecting extensions adapted to be engaged by the pivoted spring actuated detents 98 and 99 pivoted to brackets 130 (see Figs. 3, 4, 8 and 9) so as to hold the frame in a rearwardly inclined position while the manifolding operation is being carried out. The forwardly projecting pin 101 on the base frame is adapted to strike against the up-standing projection 101' on the rock shaft 102 which carries the paper guide springs 103 and 104 and rotates the shaft against the action of the springs 105 so that the angular projection 106 thereof will be engaged by the detent 107 which is actuated by spring 107'. This engagement is effective to move the paper guide springs, lever 108 and fingers 112, away from the frame as will be presently explained.

108 is a pivoted rocking lever having a tooth or notched head 109 on its lower edge and having its upper edge adapted to bear against pin 110 on the detent engaging the paper guide clip shaft (see Fig. 19). The spring 108' for lever 108 has a normal tendency to cause tooth 109 to move downwardly into contact with the cam 111 on the tooth segment, but this movement is limited by the finger 112 on the other side of flange 31 which bears against pin 113. When the lever 108 is moved in an upward direction it will release the detent from engagement with the paper guide spring shaft and permit the coil spring on said shaft to throw the guide springs over toward the base frame of the paper measuring mechanism.

On the base frame 94 is a supplemental frame 114 which has vertical sliding movement to measure the paper. The frame 114 is mounted in channel guides 115 and 116 which constitute the side bars of the main frame 94. On the base frame 94 is a slotted bar 117 on which a channeled slide 118 carried by frame 114 is mounted, the slide carrying a cross head 119 to which the operating mechanism is connected. This operating mechanism is best shown in Figs. 16, 17 and 18 as comprising the links 120 and 121 terminally connected to the cross head as shown and to the levers 122 and 123. The levers 122 and 123 are pivoted to the frame 94 and have offsets or shoulders 124 and 125, which bear against the ends of the elbow levers 126 and 127 to which they are pivoted; the latter being pivoted to the frame 94. The extensions 128 and 129 of levers 126 and 127 are adapted to bear against the brackets 130 and 131 as will be presently explained. The levers 126 and 127 are actuated to raise the frame 114 by the springs 132 and 133 connected to the levers and to the side bars of the frame 94 as shown in Fig. 16. 134 and 135 designate additional springs connected to ends of the levers 126 and 127 and to the levers 122 and 123 respectively. These later designated springs are designed to temporarily retard the operation of the paper gripping jaw which is actuated only after the carbons have been withdrawn.

Springs 132 and 133 swing the frame 94 forward to a vertical position but levers 122 and 123 and their operating mechanism, are stopped in their upward travel by latch 136 and are held in the position until pawl 111 on the gear segment passes under pawl 137 pivoted on flange 31 which raises lever 138 on flange 31, the latter lever 138 being pivoted on base frame 94.

The lever 138 raises lever 139 on the outer end of the shaft 140 which carries the latch 136. When the latch 136 is actuated (by shaft 140 and levers just described) to release levers 122 and 123, the springs 134 and 135 cause actuation of the lever and link mechanism to cause the supplemental frame to travel upward until the cross 119 comes into contact with the adjustable abutment or stop shown as a screw 141 in the top rail of the frame 94. The adjustable stop is for the purpose of correcting any slight variation in the register in the printed form used upon the machine.

In actual practice the frame 114 may be adjusted with respect to the main frame 94 so as to measure off different lengths of paper to accommodate different lengths of invoices, the amplitude of movement of the frame 114 in each instance being the same but its position of amplitude of movement being variable on account of the adjustment. This adjustment consists in providing a perforated bar 142 on the rear side of frame 114 and parallel to slotted bar 117 on frame 94. The perforated bar 142 carries a clamping bolt 143 passing through a selected hole in bar 114 and through an opening in cross head 119 to bind the sliding frame 114 to cross head, therefore any movement of the cross head will be partaken by the frame and the position of the top rail of frame 114 with respect to the base when starting its upward movement will determine the length of paper measured off.

Inasmuch as the paper and the carbons are fed together through the machine during the manifolding operation it becomes necessary to permit the carbons to be retracted before the paper is measured, it being understood that the paper extends a short distance beyond the forward edge of the carbon at each operation.

The gripper consists of a jaw 144 extending entirely across the frame 114 to which it is pivoted and which has a tendency to bear against the frame 114 on account of the springs 145 and 146 so the edge of the paper may be clamped over the pin 147, the springs 148 tending, when the jaw 144 is open to strip the impaled paper off the pins. The gripper has a normal tendency to remain closed but may be opened by a sliding bar connected to bar 150 so that when 150 strikes against the bottom rail of the frame 94 the continued downward movement of frame 114 will permit the lip 151 to open the jaw against action of springs 145 and 146. It will be observed bars 149 and 150 are connected together by 143 heretofore described the bars 149 and 150 being additionally secured by the dowel pins 153.

When the machine is in condition to permit the manifolding operation to be performed, the frame 94 with the frame 114 in a retracted position is inclined rearwardly. To set the frames in operating position as just described, the operator takes hold of the handle or plate 154 at the top of the frame 114 and by exerting a downward and rearward movement, the extensions 128 and 129 are forced against the upper edges of the brackets 130 to hold the sliding frame 114 in a retracted position, the main frame 94 being held in its inclined position by the detents 98 and 99 which engage the latch bars 96 and 97. When the frame 94 is first released to swing forward the frame 114 has a slight initial sliding movement to allow lip 151 to cause clamp 144 to close down upon the edge of the paper which projects beyond the carbon and impale it upon the pins 147. This action is effective in holding the paper rigid while permitting the carbon to be retracted.

When the handle 37 has been moved back far enough to cause segment 49 to almost reach the limit of its travel the cam 111 rocks lever 137 which in turn rocks lever 138 to actuate lever 139 transmitting motion through shaft 140 to catch 136 and releasing levers 122 and 123 and permitting the springs 134 and 135 to cause completion of the upward travel of the frame 114 to measure off the desired amount of paper preliminarily to severing the sheets, and upon the completion of the travel of the segment lever 137 drops behind cam 111 and acts as a retaining pawl to hold the tension upon the winding drum should the operator let go the handle 37'. The handle may be operated to kick off the lever 137 as will be presently explained.

The dog 155 is on rock shaft 156 in flange 31 connecting with dog 157 on opposite side of flange 31 which is actuated rearward against push rod 158 by spring 159. The push rod 158 extends backward along side of frame 27 connecting with lever 160 shown in Figs. 1 and 2. Dog 155 acts as a safety to protect the carbon sheets. When segment 49 is carried forward to the operating position the carbon carriage 68 (Fig. 5) is also carried forward by cams 73 and 73', spring 159 causes pawl 155 to drop into the path of bell crank 38 at the time pushing lever 160 forward in the same direction of travel as the carbon carriage. Push rod 158 actuates lever 160. When the operator pushes handle 37 to rock bell crank 38 should the operator drive the handle in excess of the speed the carbon travels backward, 38 will strike upon dog 155 to arrest the further operation of the machine until the drum 60 pulls the carbon carriage 68 back into contact with lever 160 imparting motion through 158 to dog 157 which transmits motion through 156 to pawl 155 thus lifting pawl 155 clear of the travel of bell crank 38 which will then allow handle 37' to be pushed to the end of its travel and cause the paper to be locked ready to be torn off as above described. The pawl 155 and its complementary mechanism eliminates the liability of accidental locking of the carbon between the completed manifold sheets to be torn from the strips.

The handle 37' is pivoted between the crank 37'' and the segment 49 as indicated at 162 the forward end of the handle straddling the butt of the segment 49, said handle 37' carrying a finger 161 on one side of the pivot and the handle being connected to the segment 49 by a spring 163.

Assuming that the lever 137 is behind a cam 111 as shown in Fig. 19 and it is desired to release it, the operator pulls upward on handle 37' against action of spring 163 rocking finger 161 to rock lever 165 pivoted at 164 causing lever 165 to strike against 166 on lever 137 causing it to pass out of the path of travel of cam 111, so as to release it and permitting segment 49 to be restored to manifolding position by handle 37'.

167 is a paper guide plate pivoted in plates 33 and 34 and held in normal position (Fig. 3) by springs 168 one on each side. When in normal position plate 167 guides paper between 88 and 93. When the lever 37' is depressed carrying platen rearward, the bevel at rear edge of plate passes bearing shaft of knife 88 and is tilted. To 167 are attached tripping fingers 169, one on each side of the machine. When the platen is driven to the rear, these fingers come in contact with fingers 170 (one on each side). The fingers 170 are pivoted on screws 171 on the upper ends, the lower ends of fingers 170 are bifurcated to engage pins 172 each of which is a part of a catch 98. When the paper guide 167 and the attached finger 169 is dropped rearward with the platen and its accompanying mechanism, the finger 169 strikes lever 172 causing the rearward travel of catch 98 and releases fingers 96 and 97, allowing the paper frame 94 to assume a vertical position. When the platen returns to manifold position, the inclined front on end of finger 169 causes it to depress and pass under lever 172 and thus return to its normal position.

In Figs. 5 and 6, I have shown a positioning device for the carriage 27, the purpose of which is to permit actuation of the carriage 27 with respect to the rail 21.

The positioning devices consist of a longitudinal bar and shaft 173 upon which the rollers 174 and 175 on frame 27 rest. This shaft carries a grooved roller 176 movable over the rail 21. 177 is a spring one end of which is fastened to the frame 27 and the other end to a lever 178 terminally engaging the collar 179 on the shaft 173 as shown.

Inasmuch as the frame 27 may have longitudinal movement independent of the shaft 173, it follows that the upper and lower case spacing may be accomplished by shifting the frame 27 with respect to said shaft 173. The spring will always maintain the roller 176 the proper spaced distance from the catches 29 and 29' so as to insure proper register when the carriage 27 is placed upon the rails 21 and 29.

In Figs. 8, 9 and 10, I have shown a paper spacing mechanism operable when the platen is in writing position. The gear segment 173 is held in position by a bearing 174 and is retained in this position by the action of a return spring on the gear segment 175, driving back against the stop pin 176 adapted to contact with the adjustable stop 177 which retains the segment and its bearing at 174 as illustrated in Figs. 8 and 9. The segment remains idle at all times unless the platen is in writing position as shown in Fig. 9. When in writing position the shaft 35 is inside of the hollow bearing 173' and this holds the segment in all its working positions which is through a travel of 40 degrees.

The spaced rocking roller 178 with its release lever 179 and contraction spring 180 is fastened to the sliding plate 32 which carries the sliding bearing for the shaft 35. The action of this device in spacing the paper is accomplished by the pressure exerted on the operating handle 181. By so doing, sliding bar 182 is carried through segment 173 and engages in mesh with the teeth on the wheel 183. The segment 175 is so arranged that upon the last part of the travel of the carriage to the right it is revolved forward transmitting mechanism to segment 173 and to the wheel 183 through the sliding bar 182, thus causing the platen to roll forward the number of spaces for which it is set. The space distances controlled by the lever 177 which has a set of numbered notches indicating in what position the device will space the paper upon complete travel of the paper to the right.

Sliding bar 182 is carried in tube 184 which is part of segment 173 and acts as a hollow bearing for the bar 182. The bar is returned to rest position by a small spring 185 so as to hold it in alinement with the disks 186 on the end of the operating handle.

By this arrangement it is possible to maintain the parts 175, 182, 184, 185 and 186 in position as illustrated, while the platen is making its travel to the rear and back at the same time, being able to automatically return these parts to operating position when the platen is returned to its writing point.

Having thus described my invention what I claim as new therein and desire to secure by Letters Patent, is:

1. In a manifold attachment for typewriters, means for pulling a predetermined length of paper through the attachment, said means including a swinging frame normally inclined rearwardly, means for releasing the frame to permit it to swing into vertical position, and a supplemental extensible frame on the first named frame mounted for movement longitudinally of the first named frame after the first named frame has swung to a vertical position.

2. In a manifolding attachment for typewriters, a manifolding paper feed, a multiple carbon feed, a main frame, a paper measuring frame on the main frame, and means for retracting the carbon paper feed and actuating the paper measuring frame.

3. In a manifolding attachment for typewriters, a movable table, a carriage on said table, means for feeding record paper and carbons through the carriage including friction rollers, means for spreading the friction rollers apart to release the carbon paper, means for pulling the carbon paper rearwardly with respect to the record paper, and a spring-actuated frame for pulling the record paper forward.

4. In a manifolding attachment for typewriters, a laterally movable carriage, means for feeding record paper and carbons through the carriage including friction rollers, means for spreading the friction rollers apart to permit the release of the carbon paper, means for moving the carbon paper with respect to the record paper, and a measuring frame for pulling the record paper in a direction opposite to the direction of movement of the carbon paper.

5. In a manifolding attachment for typewriters, a record paper feeding mechanism and a carbon paper feeding mechanism, the latter having movement independent of the first named feeding mechanism and comprising removable clamping bars for the carbon paper spaced apart to permit the record paper to be clamped therebetween independent of the carbon paper.

6. In a manifolding attachment for typewriters, a paper feeding mechanism, a carbon paper carriage, cam actuating means for advancing the carriage toward the forward edge of the paper and a winding drum for retracting the carriage away from the forward edge of the paper.

7. In a manifolding attachment for typewriters, a paper feeding mechanism, a carbon paper feeding carriage, a paper clamping means intermittently operative and inoperative and a paper measuring means actuated when the paper clamping means is inoperative.

8. In a manifolding attachment for typewriters, a paper feeding mechanism, a carbon paper feeding carriage, a paper clamping means intermittently operative and inoperative and a paper measuring means actuated when the paper clamping means is inoperative and means for actuating the paper clamping means after the paper measuring means is operated.

9. In a manifolding attachment for typewriters, record paper feeding means, a carbon paper feeding means, mechanism having movement to clamp the record paper against movement and to permit the carbon paper to be retracted away from the advanced portion of the record paper and means for positively advancing predetermined lengths of record paper through the manifolding attachment.

10. In a manifolding attachment for typewriters, a record paper feeding means, a carbon paper feeding means, a paper clamp and a measuring means coöperating with the record paper feeding means and the carbon paper feeding means to measure the point at which the record paper is to be engaged by the clamp.

11. In a manifolding attachment for typewriters, the manifolding paper feed, a multiple carbon feed, a paper measuring frame and means for simultaneously retracting the carbon paper feed and actuating the paper measuring frame.

12. In a manifolding attachment for typewriters, a lateral moving table, a carriage on said table, means for feeding record paper and carbons through the carriage including friction rollers, means for spreading the friction rollers apart to permit release of the carbon paper, means for pulling the carbon paper rearwardly with respect to the record paper and means for pulling the record paper forward.

13. In a manifolding attachment for typewriters, a carriage, a paper feeding means to receive paper passing through said carriage, said paper feeding means comprising a swinging frame over which the paper passes, a movable supplemental frame carried by the first named frame and having movement away from one end of the first named frame, a paper engaging means on the movable frame, and means for releasing the movable frame to permit it to operate.

14. In a manifolding attachment for typewriters including means for pulling a predetermined length of paper through the attachment, said means including a swinging device normally rearwardly inclined and means for releasing the device to permit it to swing vertically, and an extensible member on the device having movement longitudinally of the device after it has swung to its vertical position.

15. In a manifolding attachment for typewriters, a supporting bracket having a transverse guide rail, a carriage to be supported on said rail, a grooved wheel engaging said rail and a longitudinal movable shaft on which the wheel is mounted.

16. In a manifolding attachment for typewriters, a supporting bracket having a transverse guide rail, a carriage to be supported on said rail, a grooved wheel engaging said rail and a spring actuated movable shaft on which the wheel is mounted.

17. In a manifolding attachment for typewriters, a platen, a paper feeding machine, a paper measuring mechanism comprising two frames, one of which is movable longitudinally of the other, a paper gripper for gripping the free edge of the record paper, a paper gripping knife to engage the paper intermediate its ends at the point of severance and means for actuating the paper gripper to release the paper when the paper gripping knife is in clamping position.

18. In a manifolding attachment for typewriters, a laterally movable carriage means for feeding record paper and carbons through the carriage including friction rollers, means for spreading the friction rollers apart to permit release of the carbon paper, means for pulling the carbon paper rearwardly with respect to the record paper, means for pulling the record paper forward, and means for restoring the friction rollers to functional position.

In testimony whereof I affix my signature.

FRED G. WHITE.